United States Patent [19]
Dorsman

[11] Patent Number: 5,379,114
[45] Date of Patent: * Jan. 3, 1995

[54] RING LASER GYRO SCALE FACTOR ENHANCEMENT CIRCUIT

[75] Inventor: Adrian K. Dorsman, Bellflower, Calif.

[73] Assignee: Rockwell International Corporation, Seal Beach, Calif.

[*] Notice: The portion of the term of this patent subsequent to May 12, 2004 has been disclaimed.

[21] Appl. No.: 510,473

[22] Filed: Jul. 1, 1983

[51] Int. Cl.$^6$ .................. G01B 9/02; H01S 3/083; H03L 7/00

[52] U.S. Cl. ...................... 356/350; 372/94; 327/119; 327/122

[58] Field of Search .................. 356/350; 372/94; 307/529, 271

[56] References Cited

U.S. PATENT DOCUMENTS

| | | | |
|---|---|---|---|
| 3,710,146 | 1/1973 | Ohsawa | 307/271 |
| 3,807,866 | 4/1974 | Zingery | 356/350 |
| 4,051,386 | 9/1977 | Long et al. | 307/271 |
| 4,108,553 | 8/1978 | Zampiello et al. | 356/350 |
| 4,290,697 | 9/1981 | McLandrich | 356/350 |
| 4,329,056 | 5/1982 | Lacombat | 356/350 |
| 4,342,517 | 8/1982 | Johnson et al. | 356/350 |
| 4,359,688 | 11/1982 | Haville | 307/271 |
| 4,582,429 | 4/1986 | Callaghan | 356/350 |
| 4,664,523 | 5/1987 | Dorsman | 307/515 X |

Primary Examiner—Stephen C. Buczinski
Attorney, Agent, or Firm—H. Fredrick Hamann; George A. Montanye; Tom Streeter

[57] ABSTRACT

A ring laser gyro scale factor enhancement circuit connected between at least one power supply voltage level and a reference potential for conditioning at least a first and second input signal from a ring laser gyro assembly, the first and second input signals being essentially sinusoidal and having a common first input signal frequency, the second input signal having a predetermined first phase relationship with the first input signal for a first ring laser gyro rotational sense and a second predetermined phase relationship with the first input signal for a second ring laser gyro rotational sense. The ring laser gyro scale factor enhancement circuit comprises at least one frequency multiplier circuit responsive to the first and second sinusoidal input signals at a first signal frequency for providing at least a first and second relatively sinusoidal output signal at a higher output signal frequency, the frequency of each first and second relatively sinusoidal output signal being a multiple of the integer two raised to a positive integer power times the common first input signal frequency of the first and second input signal; whereby, the ring laser gyro output signal scale factor is enhanced.

6 Claims, 3 Drawing Sheets

RING LASER GYRO SCALE FACTOR ENHANCEMENT CIRCUIT

BACKGROUND OF THE INVENTION

1. Field of the Invention

This invention relates to improvements in ring laser gyroscope accuracy, and more particularly to the electronic circuitry used to process the electronic signals emanating from the ring laser gyro optical detector typically employed for use with a ring laser gyro, This invention even more particularly relates to a circuit for increasing the resolution of a ring laser gyroscope,

2. Description of the Prior Art

Ring laser gyroscopes are known in the art to produce outputs comprised of optical fringes occurring at a rate dependent upon the rate of rotation of the ring laser gyroscope in inertial space, Typically, two outputs are developed from a ring laser gyro optical detector coupled to the ring laser gyro, The ring laser gyro optical detector typically contains an excited photo diode array which when illuminated detect the optical frequency difference of clockwise and counterclockwise laser beams within the ring laser gyroscope, The photo diode array generates a two phase resolver type signal wherein one signal leads the other or lags the other by 90 degrees, depending upon the sense or direction of rotation of the ring laser gyro body in inertial space of the ring laser gyroscope.

One circuit that has been advanced includes a pulse modification circuit for each output line including a preamplifier and trigger squaring circuit together with logic circuitry to produce a first output representing clockwise pulses and a second output representing counterclockwise pulses. The output pulses produced by this apparatus tracked, one for one, the output pulses of the ring laser gyroscope; consequently, the resolution of the entire circuit was limited by the pulse output frequency developed by the ring laser gyroscope.

Another circuit that has been advanced is described in an application for U.S. Patent, titled Apparatus for Increasing the Resolution of a Laser Gyroscope, Ser. No. 457,845, filed Jan. 14, 1983, naming this same inventor and common assignee. The object of this circuit was to provide an output pulse rate at a multiple of the pulse rate developed from the frequency difference of the clockwise and counterclockwise laser beams within the gyroscope. Another object of this invention is to provide a direction signal for use in processing the output pulse signals. The output pulse signals from this invention circuit are adapted to be applied directly to an up/down counter. This circuit is constructed of digital circuit elements and as such is unlike and does not anticipate the invention ring laser scale factor enhancement circuit which depends on linear circuit elements and functions based on analog circuit principles and trigonometric identities.

SUMMARY OF THE INVENTION

In the light of the above, it is therefore an object of the invention ring laser gyro scale factor enhancement circuit to receive at least a first and second essentially sinusoidal input signal from a ring laser gyro assembly, the input signals having a common first input signal frequency, the ring laser gyro scale factor enhancement circuit having at least one or more frequency multiplier circuit, each respective pair of frequency multiplier circuit outputs being coupled to the inputs of a succeeding frequency multiplier circuit, and each respective frequency multiplier circuit generating sinusoidal output signals having an output signal frequency that is two times the frequency of the input sinusoidal signal to the frequency multiplier circuit.

It is another object of the invention to provide a pair of output sinusoidal signals at a frequency that is a multiple of $2^n$ times the input frequency where n is equal to the number of frequency multiplier circuits, and having the same relative phase shift between each of the output sinusoidal signals as the phase shift between the input sinusoidal signals.

It is yet another object of the invention circuit to reverse the phase shift of the second output sinusoidal signal with respect to the first output sinusoidal signal in response to a change in the phase shift of the second input sinusoidal signal with respect to the first input sinusoidal signal.

The invention circuit, in its broad aspect, is adapted to receive and condition a first and second sinusoidal input signal at a first signal frequency from a ring laser gyro assembly. The second input signal leads the first input signal with a predetermined phase angle for a first ring laser gyro rotational sense and the second input signal lags the first input signal with a predetermined phase angle for a second ring laser gyro rotational sense. The invention ring laser gyro scale factor enhancement circuit has at least one frequency multiplier circuit, each frequency multiplier circuit being responsive to the first and second sinusoidal input signals at a first signal frequency for providing a first and second relatively sinusoidal output signal at a higher output signal frequency than the frequency of the first and second sinusoidal input signals. The output signals of each respective frequency multiplier circuit are coupled to the inputs of a succeeding frequency multiplier circuit, the output signal frequency of each frequency multiplier circuit being double the frequency of the input signals to that multiplier circuit.

DESCRIPTION OF THE PREFERRED EMBODIMENT

Figure 1:
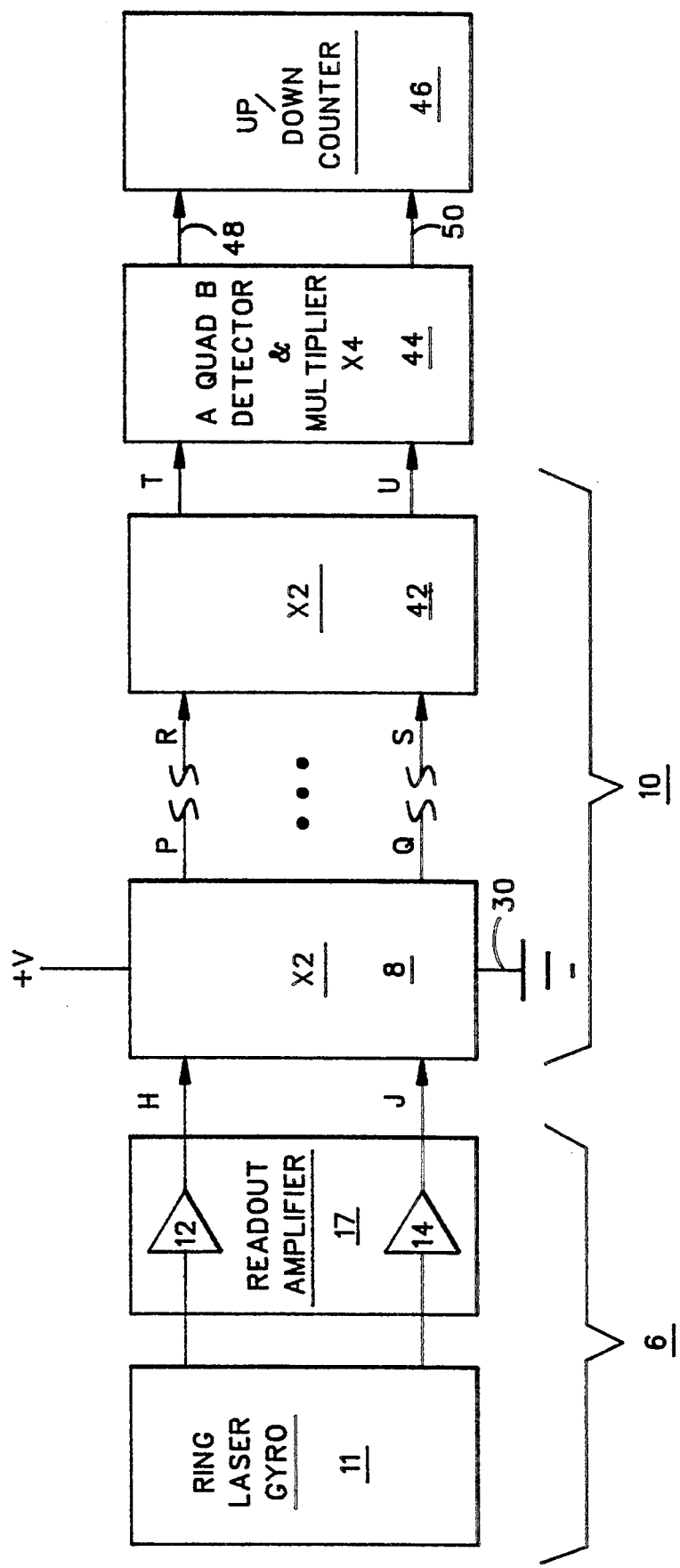
FIG. 1 is a block diagram depicting the application of several stages of the frequency multiplier circuits comprising invention ring laser gyro scale factor enhancement circuit.

In accordance with the present invention, FIG. 1 is a block diagram showing the invention ring laser gyro scale factor enhancement circuit 10 for use with a ring laser gyro shown as block 11 coupled to a ring laser gyro optical detector (not shown) the outputs of which are coupled to Readout Amplifier block 17. For the purpose of illustration, the combination of blocks 11 and 17 comprise the ring laser gyro assembly 6. The ring laser gyro scale factor enhancement circuit 10 is connected between at least one power supply voltage level +V and a reference potential, such as ground 30. Conventional design practice is to use balanced +V and −V source such as +12 V and −12 V. The ring laser gyro scale factor enhancement circuit is adapted to receive a first and second sinusoidal input signal such as $H=A*COS(wt)$ and $J=A*COS(wt\pm\pi/2)$ from readout amplifiers 12 and 14 respectively. The coefficient "A" typically defines the peak voltage swing of the respective signal. The symbol "*" is used to designate multiplication. The first and second sinusoidal input signals H and J have a first signal frequency "w" as they are received by the readout amplifiers 12 and 14 from the ring laser gyro optical detector (not shown). The readout amplifiers 12 and 4 provide amplification and scale the respective signals H and J for processing by the first stage of the ring laser gyro scale factor enhancement circuit 10.

The second input signal J has a predetermined first phase relationship with the first input signal, H, such as $+\pi/2$ radians, for a first ring laser gyro rotational sense and a second predetermined phase relationship phase relationship with the first input signal, H, such as $-\pi/2$ radians, for a second ring laser gyro rotational sense. The symbol "w" is used to represent radians/sec. The rotational sense of the ring laser gyro is determined from its angular velocity as projected onto its sensitive axis, the angular velocity being measured with respect to an inertial reference, such as a distant star.

The ring laser gyro scale factor enhancement circuit 10 comprises a circuit, that has at least one frequency multiplier circuit such as that represented by block 8. Block 8 is labelled as X2 signifying that its function is to double the frequency of the two input signals, H and J, to produce its two output signals, P and Q.

The ring laser scale factor enhancement circuit 10 is adapted to receive a first and second sinusoidal input signal represented by the letters H and J at a first signal frequency, such as "w", for providing at least a first and second relatively sinusoidal output signal, such as $P=K*COS(2^n*wt)$ and $Q=\pm K*SIN(2^n*wt)$. The signals P and Q are at a nigher output signal frequency than the input signal frequency. The output signal frequency is a multiple of the integer two raised to a positive integer power n, times the frequency of the input signal at a first signal frequency "w". The invention ring laser gyro scale factor enhancement circuit is intended to include at least one frequency multiplier stage, but is not limited to one frequency multiplier stage. The positive integer power n to which the integer two is raised is equal to the number of frequency multiplier circuits, such as that represented by block 8 and 42, that are used. Thus, for a circuit having three frequency multiplier circuits, $n=3$ and $2^3=8$.

The block diagram of FIG. 1 shows two stages of frequency multiplier circuits represented by blocks 8 and 42 with an unspecified number of these circuits being interposed between blocks 8 and 42. By way of example, if an additional ring laser gyro scale factor enhancement circuit (not shown) is interposed between blocks 8 and 42, a total frequency multiplication of 8 is achieved. Block 8 doubles the frequency of signals H and J to provide first stage signals P and Q at a frequency of 2 w. First stage output signals P and Q are fed as input signals to the added (Put not shown) frequency multiplier circuit interposed between blocks 8 and 42. The added (but not shown) second stage frequency multiplier circuit doubles the frequency of signals P and Q to provide second stage output signals R and S at a frequency of 4 w as input signals to third stage block 42. Block 42 doubles the frequency of signals R and S to provide sinusoidal output signals T and U at a frequency of 8 w as inputs to the A QUAD B DETECTOR AND MULTIPLIER ×4, block 44.

The A QUAD B DETECTOR AND MULTIPLIER ×4 block 44 is the subject of U.S. patent application Ser. No. 457,845 filed Jan. 14, 1983 by this same inventor and common assignee. The object of the A QUAD B DETECTOR AND MULTIPLIER ×4 block 44 is to provide a circuit for generating output pulses on lines 48 and 50 at a frequency that is a multiple of four times the frequency of signals T and U. It is another objective of the circuit of block 44 to provide a pair of signals that indicate the direction of rotation of the ring laser gyro. The frequency of the pulses on signal lines 48 and 50 in a typical application are scaled to indicate the inertial rate of rotation of the ring laser gyro and are fed to the UP/DOWN COUNTER 46 for integration.

Figure 2:
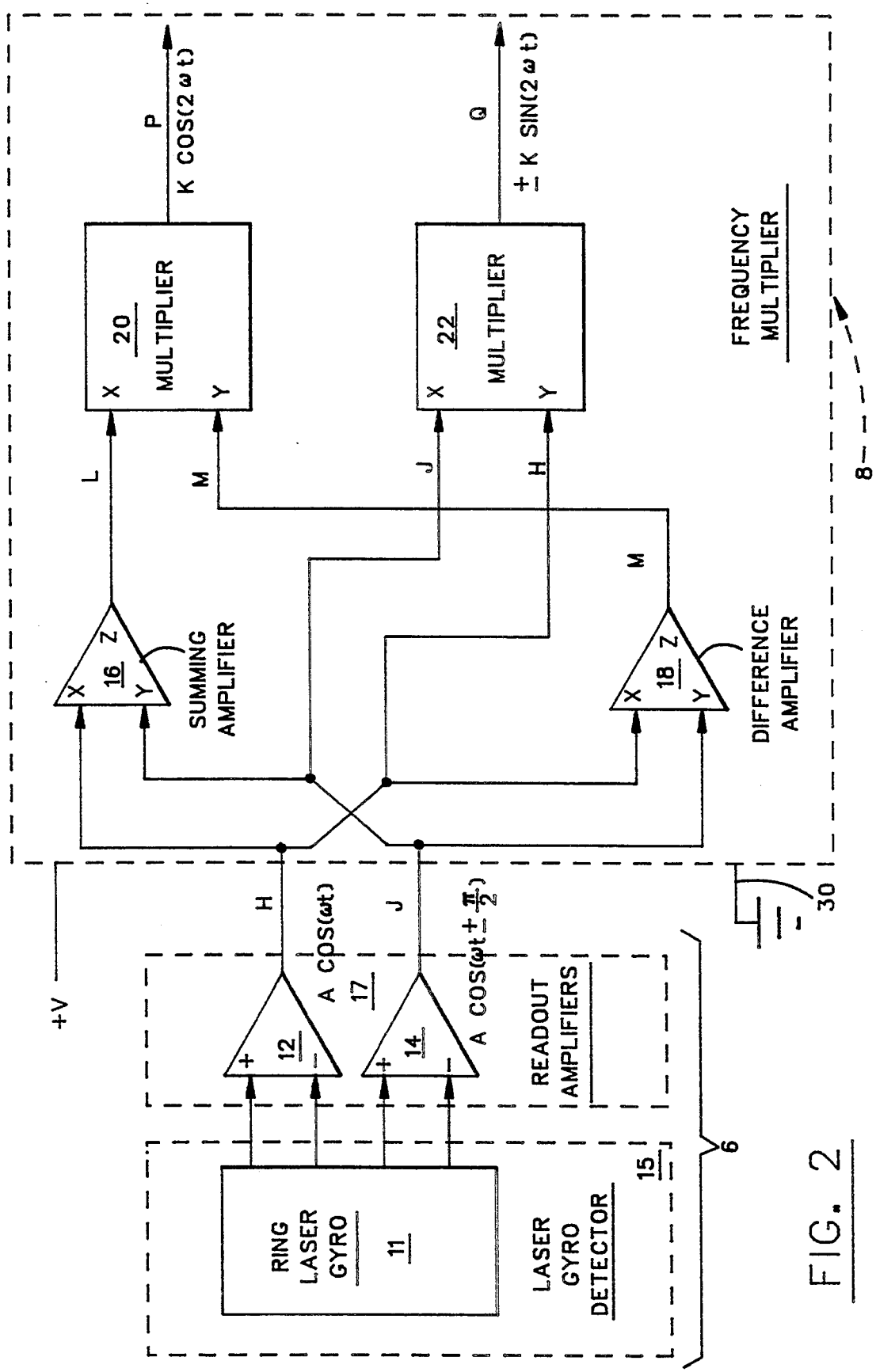
FIG. 2 is a block diagram of a single stage ring laser gyro frequency multiplier circuit.

FIG. 2 is a block diagram showing the elements within the frequency multiplier circuit 8 having sinusoidal signal inputs H and J and sinusoidal output signal P and Q at twice the frequency of signals H and J. In an alternative embodiment using a plurality of frequency multiplier circuits 8, such as that depicted in FIG. 2, the output signal frequency is a product of the input signal frequency w times a multiple of the integer two raised to a positive integer Dower. In the case of a ring laser gyro scale factor enhancement circuit 10 having a single frequency multiplier circuit stage, the integer power n to which two is raised is 1 and the sinusoidal output signals P and Q are provided at a frequency double that of the input signals H and J.

In another alternative embodiment using two frequency multiplier circuits 8 connected in series or tandem, the integer power is two and the output signal frequency of the second enhancement circuit would be four times the input signal frequency.

FIG. 2 is a preferred embodiment of the block diagram of the frequency multiplier circuit 8 depicted in FIG. 1.

Block 16 is intended to represent a summing amplifier means for producing sum output signal relatively equal to the arithmetic sum of the first and second input signals, multiplied by a first constant scale factor. Summing amplifier 16 receives first and second input signals such as H and J at its input terminals X and Y and provides a relatively sinusoidal output signal $L=H+J$ at its output terminal Z. Signal L is coupled to the X input of first multiplier 20.

Block 18 represents a difference amplifier for providing a difference output signal equal to the arithmetic difference between the first and second input signals multiplied by a first constant scale factor. Difference amplifier 18 receives first and second input signals H and J, signal J being coupled to the inverting input of difference amplifier 18. The difference output signal $M=H-J$ is provided at output terminal Z. Difference amplifier 18 is also adapted to multiply output signal M by a first constant scale factor.

Block 20 represents a first multiplier circuit means for providing a first output signal by multiplying the sum output signal, such as L, by the difference output signal, such as M. Multiplier 20 provides a first output signal P representing $P=L*M$. Output signal P is of the form $P=K*COS(2 wt)$.

Block 22 represents a second multiplier circuit means for providing a second output signal By multiplying the first and second input signals. Multiplier 22 receives first and second input signals, such as H and J, at inputs X and Y and provides a second output signal $Q=J*H$ where second output signal Q is of the form ±j*SIN (2 wt).

In this manner, the single stage frequency multiplier circuit 8 operates to provide first and second output signals P and Q at two times the frequency of the input signals, H and J. The first and second output signals P and Q have a phase shift in relation to each other that is relatively equivalent to the phase shift between the first and second input signals H and J.

Figure 3:
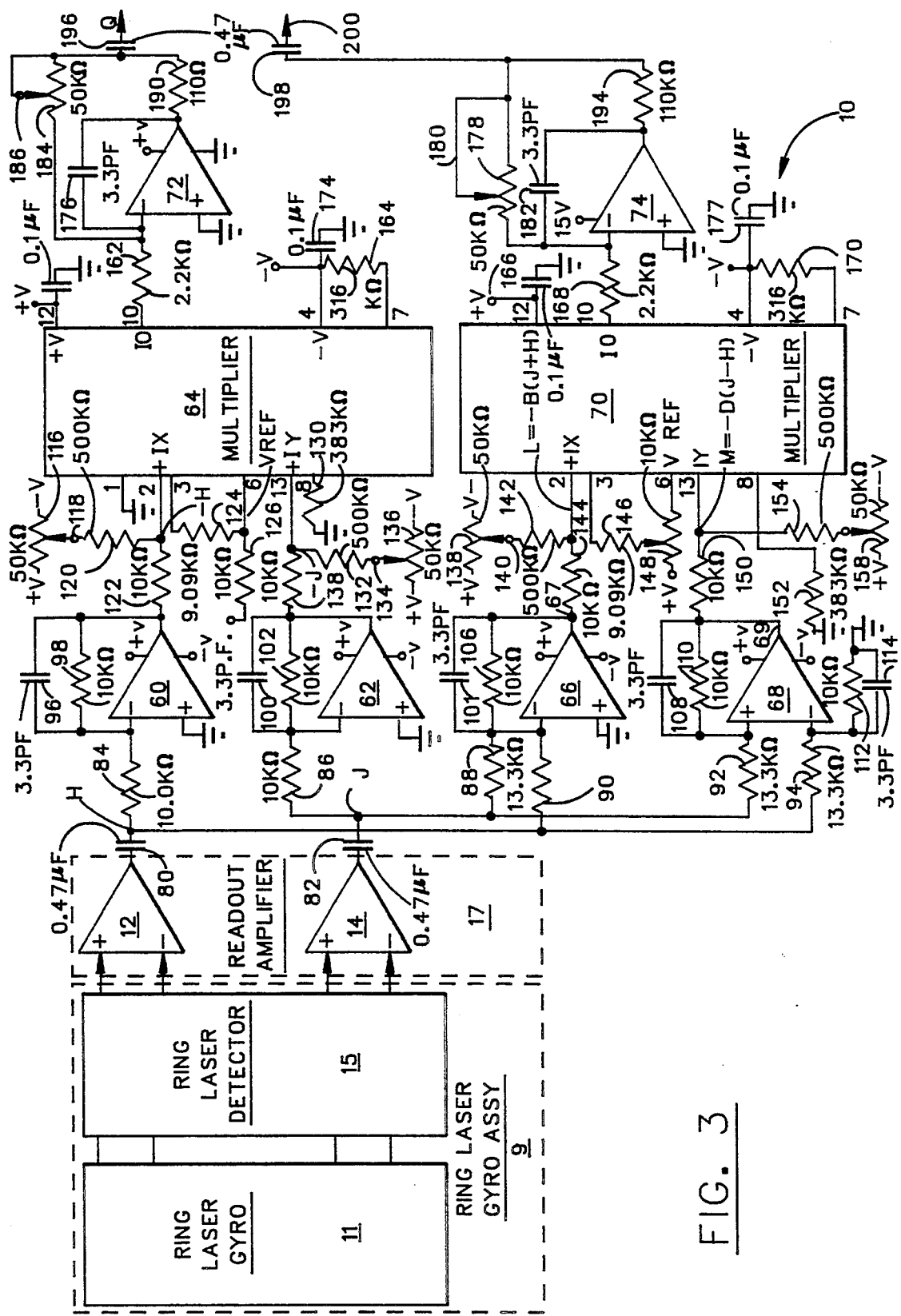
FIG. 3 is a schematic drawing of the invention ring laser gyro scale factor enhancement circuit.

FIG. 3 represents a particularly preferred alternative circuit embodiment of the block diagram of FIG. 2. Inverting amplifier 66 is adapted to receive input signals J and H on input resistors 88 and 90 respectively. Resistor 106 is scaled to establish the closed loop gain of the amplifier. The gain of the amplifier 66 is established by the ratio of the feedback resistor 106 to the input resistors 88, 90. The amplifier output at 67 is an analog signal L=B(J+H). Signal L is applied through resistor 144 to multiplier 70 input pin 2. The letter "B" represents a gain constant. Resistors 142 and 138 provide a balance and gain control. Wiper 140 is adjusted to obtain a proper operating point.

Referring momentarily again to FIG. 2, difference amplifier 18 is adapted to receive sinusoidal input signal H at its non-inverting terminal X and sinusoidal input signal J at inverting input terminal Y and to provide output signal M at terminal Z to multiplier 20 input terminal Y.

The function of difference amplifier 18 of FIG. 2 is implemented in FIG. 3 by amplifier 68. Amplifier 68 has input resistors 92 and 94 coupled to receive sinusoidal input signals J and H, respectively. Feedback resistor 110 is coupled from the amplifier 68 output at 69 to its inverting input and, in cooperation with resistor 92 establishes the closed loop gain of amplifier 68 for sinusoidal input signal J. Resistors 94 and 112 are coupled together and form a voltage divider having a tap coupled to the non-inverting input of amplifier 68. Resistors 94 and 112 attenuate sinusoidal input signal H to the non-inverting input of amplifier 68. The output signal of amplifier 68 is therefore equal to M=−D(j−H) where the scaling of both J and H are conveniently controlled by the ratios of the respective attenuator resistors 94 and 112 and the ratio of or the respective input resistor 92 to the feedback resistor 110. The letter "D" represents a gain constant. The output from amplifier 68 at terminal 69 is coupled through resistor 150 to the first multiplier 70 non-inverting input pin 13. Resistor 154 is connected between the pin 13 input of first multiplier 70 and the wiper of potentiometer 158, and adjusted to balance the input to the amplifier for zero input signal conditions. Resistors 146 and 148 are selected and adjusted to set the operating point of first multiplier 70 as described in the application's notes for the RCA CA3091D.

First multiplier 70 receive input signals on pins 2 and 13 scaled to represent the signal L=−B(J+H) at pin 2 and M=−D(J−H) at pin 13 where B and D are constants selected to balance the signals and to prevent saturation of the multiplier output signal at pin 10.

Multipliers 70 and 64 are typically a conventional analog multiplier integrated circuit of a type similar or equivalent to the RCA CA3091D. Other monolithic linear multiplier integrated circuits can be used to implement the analog signal relationships described above; however, care should be taken to insure that the available band width of the multiplier integrated circuit selected is sufficient for the intended application to avoid excessive error or unanticipated phase shift at higher frequencies.

The output of first multiplier 70 is the product of the sum output signal L=−B(J+H) by the difference signal M=−D(J−H) where D and B are constants. The output of first multiplier 70 is coupled from pin 10 to resistor 168 to the inverting input of ground referenced amplifier 74. Amplifier 74 amplifies and scales the product of L*M by the scale factor R where R is the ratio of resistors 178 and 168. Therefore the output of amplifier 74 is P=R*(L*M) which is coupled through resistor 194 and decoupling capacitor 198 to output terminal 200.

The inverting amplifier 60 receives the first input signal H on input resistor 84. Resistor 98 is scaled to establish the closed loop gain of the amplifier. The output of amplifier 60 is therefore proportional to −H, the amplitude of the signal being scaled to prevent saturation of subsequent stages by controlling the ratio of the feedback resistor 98 to the input resistor 84. The −H signal is coupled from the output of amplifier 60 through resistor 122 to the pin 2 input of second multiplier 64.

The inverting amplifier 62 receives the second input signal J on input resistor 86. Resistor 102 is scaled to establish the closed loop gain of the amplifier. The output of amplifier 62 is therefore proportional to −J, the amplitude of the signal being scaled to prevent saturation of subsequent stages by controlling the ratio of feedback resistor 102 to input resistor 86. The −J signal is coupled from the output of amplifier 62 through resistor 128 to the pin 13 input of second multiplier 64.

Second multiplier 64 receives inputs −H and −J on its inputs and produces a signal proportional to second output signal S=(−H)*(−J) on its output pin 10. The output of multiplier 64 is scaled by ground referenced inverting amplifier 72 to provide output signal Q. The output from pin 10 is fed through resistor 162 to the inverting input of amplifier 72. The ratio of feedback resistor 184 to input resistor 162 controls the closed loop gain of amplifier 72. Amplifier 72 therefore amplifies and scales the product of S=(−H)*(−J) by a scale factor T where T is the ratio of resistors 184 and 162. Therefore the output of amplifier 72 is Q=T*(H*J). This ratio is adjusted to prevent saturation of subsequent stages.

Compensation capacitors are shown in shunt with all feedback resistors to control the bandwidth and phase shift of the respective amplifiers.

Resistors 116, 120, 126, 124, 132 and 136 are selected to set the operating point of the multiplier and to balance the inputs as discussed above for similar components relating to first multiplier 70.

The following analysis is provided to show that the circuit of FIG. 3 performs the function of the frequency multiplier 8 of FIG. 2. Referring to FIG. 3, let the input signals H and J be defined as having the following form typical of signals out of the ring laser gyro assembly 6.

1. H=A*COS(wt)
2. J=A*COS(wt+π/2)
3. Let a=(wt)
4. Let b=(wt +π/2)

The output of multiplier 70 is the product of its two inputs, the output of multiplier 70 being inverted, amplified and scaled by amplifier 74 to provide first output signal P where:

5.
$P = -R*(L*M) = -R*((-B*(J+H))*(-D*(J--H))$

6. $P = -RBD*(J^2 - H^2)$
7. $P = -RBD*[(A^2)*(\cos b)^2 - (A^2)*(\cos a)^2]$
8. $P = -RBDA^2*[(\cos b)^2 - (\cos a)^2]$
9. but $(\cos b)^2 - (\cos a)^2 = \sin(a+b)*\sin(a-b)$
10. $\sin(a+b) = \sin(2wt + \pi/2)$
11. $\sin(a-b) = \sin(-\pi/2) = -1$
12. So $P = -RBDA^2*\sin(2wt + \pi/2)*(-1)$
13. Therefore $P = RBDA^2*\sin(2wt + \pi/2)$ Since $RBDA^2$ is a proportionality constant, so by setting $RBDA^2 = K$ $$P = K*\sin(2wt + \pi/2)$$

The output of multiplier 64 is the product of $-H$ and $-J$. This product is scaled and inverted by inverting amplifier 72 to be the second output signal Q such that 14. $Q = -T*(H*J)$
15. And $Q = -T*(A^2)(\cos a * \cos b)$
16. But $(\cos a * \cos b) = \frac{1}{2}[\cos(a-b) + \cos(a+b)]$
17. $\cos(a-b) = \cos(-\pi/2) = 0$
18. $\cos(a+b) = \cos(2wt + \pi/2)$
19. $\cos(a+b) = -\sin(2wt)$
20. Therefore: $Q = -T*(A^2/2)(-\sin(2wt))$
21. $Q = T*(A^2/2*\sin(2wt)$ Since $A^2/2$ is a proportionality constant, $T*(A^2/2)$ is also set equal to K.
22. Therefore: $Q = K*\sin 2wt$. By a similar analysis, the circuit of FIG. 3 can be shown so provide a second output of
23. $Q = -K*\sin(2wt)$ in response to first and second input signals $H = A*\cos(wt)$ and $J = A*\cos(wt - \pi/2)$ Accordingly, there has been described an invention circuit for enhancing the resolution of signals from a ring laser gyro assembly by successively doubling the signal frequency of the signal from the ring laser gyro assembly. Although the invention circuit has been disclosed and illustrated in detail, it is to be clearly understood that the same is by way of illustration and example only and is not to be taken by way of limitation, the spirit and scope of this invention being limited only by the terms of the appended claims.

What is claimed is:

1. A ring laser gyro scale factor enhancement circuit combination connected between at least one power supply voltage level and a reference potential comprising:

first and second circuit output terminals;
   a ring laser detector and readout amplifier means for conditioning at least a first and second input signal from a ring laser gyro assembly, said first and second input signals being essentially sinusoidal and having a common first input signal frequency, said second input signal having a predetermined first phase relationship with said first input signal for a first ring laser gyro rotational sense and a second predetermined phase relationship with said first input signal for a second ring laser gyro rotational sense;
   at least one frequency multiplier circuit responsive to said first and second sinusoidal input signals at a first signal frequency for providing at least a first and second relatively sinusoidal output signal at respective circuit output terminals at a higher output signal frequency, the frequency of each first and second relatively sinusoidal output signal being a multiple of the integer two raised to a positive integer power times the common first input signal frequency of said first and second input signal;
   whereby, said ring laser gyro output signal scale factor is enhanced and said ring laser gyro accuracy is increased.

2. The combination of claim 1 wherein said positive integer power is equal to the number of frequency multiplier circuits.

3. The combination of claim 2 wherein the outputs of each respective frequency multiplier circuit are coupled to the inputs of a succeeding frequency multiplier circuit.

4. The combination of claim 2 wherein each respective frequency multiplier circuit comprises:
   a summing amplifier means for producing a sum output signal relatively equal to the arithmetic sum of said first and second input signals, multiplied by a first constant scale factor;
   a difference amplifier means for providing a difference output signal equal to the arithmetic difference between said first and second input signals multiplied by a second constant scale factor;
   a first multiplier circuit means for providing a first relatively sinusoidal output signal by multiplying said sum output signal by said difference output signal,
   a second multiplier circuit means for providing said second relatively sinusoidal output signal by multiplying said first and second input signals;
   whereby, said ring laser gyro scale factor enhancement circuit operates to provide said first and second relatively sinusoidal output signals at two times the frequency of said input signals, said first and second output relatively sinusoidal signals having a phase shift in relation to each other that is relatively equivalent to the phase shift between said first and second input signals.

5. A ring laser gyro scale factor enhancement circuit combination connected between at least one power supply voltage level and a reference potential comprising:
   ring laser gyro detector and readout amplifier means for providing a first gyro output signal of the form $A*\cos(wt)$ at a first output terminal and a second gyro output signal of the form $A*\cos(wt + \pi/2)$ at a second output terminal; and
   means for receiving and conditioning said first and second gyro output signals from said ring laser gyro detector and readout to form amplifier first and second input signals, said first and second input signals being essentially sinusoidal and having a common first input signal frequency, said second input signal having a predetermined first phase relationship with said first input signal for a first ring laser gyro rotational sense and a second predetermined phase relationship with said first input signal for a second ring laser gyro rotational sense;
   first and second circuit output terminal;
   at least one frequency multiplier circuit responsive to said first and second input signals, the output of each respective frequency multiplier circuit being coupled to the inputs of each succeeding frequency multiplier circuit;
   each frequency multiplier circuit having a summing amplifier having a first and second non-inverting input terminal and an output terminal, said first input terminal being coupled to receive said first input signal essentially of a form A*COS (wt) and said second input terminal being coupled to receive said second input signal of a form A*COS (wt±π/2);

a first difference amplifier having a non-inverting input terminal, an inverting input terminal and an output terminal, said non-inverting input terminal being coupled to receive said first input signal of a form A*COS (wt) and said inverting input terminal being coupled to receive said second input signal of a form A*COS (wt±π/2);

a first multiplier circuit having a first and second inverting input terminal and an output terminal, said first inverting input terminal being coupled to said summing amplifier output terminal and said second input terminal being coupled to said difference amplifier output terminal, said first multiplier circuit being adapted to provide a first signal output of a form ±K*COS (2 wt) at said first multiplier circuit output terminal;

a second multiplier circuit having a first and second input terminal and an output terminal, said first inverting input terminal being coupled to said second input signal of a form A*COS (wt±π/2), said second input terminal being coupled to receive said first input signal of a form A*COS (wt), said second multiplier circuit being adapted to provide a second signal output of a form ±K*Sin (2 wt) at said second multiplier circuit output terminal;

a first inverting ground referenced amplifier having an input coupled to the output of said first multiplier circuit for terminating the output current of said first multiplier circuit at a virtual ground;

a second inverting ground referenced amplifier having an input coupled to the output of said second multiplier circuit for terminating the output current of said second multiplier circuit at a virtual ground;

said first and second ground referenced inverting amplifier each providing respective output signals, each respective ground reference inverting amplifier output signal being coupled to respective first and second circuit output terminals, each of said first and second ground referenced amplifier output signals having a frequency double the frequency of said first and second input signals, said respective first and second input signal phase relationship being preserved in said first and second output signals.

6. A ring laser gyro scale factor enhancement circuit combination connected between at least one power supply voltage level and a reference potential comprising:

first and second output terminals;

ring laser gyro detector means for providing a first gyro output signal of the form A*COS (wt) at a first output terminal and a second gyro output signal of the form A*COS (wt±π/2) at a second output terminal; and first and second ground referenced inverting unity gain amplifiers 60, 62 each having an input and an output terminal;

an inverting unity gain summing amplifier 66 having first and second input terminals and an output terminal;

an inverting unity gain difference amplifier 68 having an inverting input and a non-inverting input;

first and second integrated multiplier circuits 64, 70, each integrated multiplier circuit having a first and second inverting input terminal and an output terminal, each integrated multiplier circuit being characterized to provide an output current out of its respective output terminal having a magnitude equal to the inverted product of the magnitude of a current into its first input terminal times the magnitude of a current into its second input terminal;

first and second inverting ground referenced output amplifiers 72, 74, each having a respective input terminal connected to the output terminal of a respective integrated multiplier circuit to terminate the output of each respective multiplier circuit at a vertical ground, each output amplifier output voltage being scaled to provide a predetermined output voltage to input current conversion, each respective first and second inverting ground referenced output amplifier output being coupled to a respective first and second output terminal;

a first input voltage to output current scale factor adjustment and bias circuit having an input coupled to receive a signal voltage from the output of said inverting unity gain summing amplifier and an output coupled to provide a scaled output current to the first input of said first integrated multiplier circuit;

a second input voltage to output current scale factor adjustment and bias circuit having an input coupled to receive a signal voltage from the output of said inverting unity gain difference amplifier and an output coupled to provide a scaled output current to the second input of said second integrated multiplier circuit;

a third input voltage to output current scale factor adjustment and bias circuit having an input coupled to receive a signal voltage from the output of said inverting unity gain summing amplifier and an output coupled to provide a scaled output current to the first input of said second integrated multiplier circuit;

a fourth input voltage to output current scale factor adjustment and bias circuit having an input coupled to receive a signal voltage from the output of said inverting unity gain difference amplifier and an output coupled to provide a scaled output current to the second input of said second integrated multiplier circuit;

the first ground referenced inverting unity gain amplifier input being coupled to receive said first gyro output signal;

the second ground referenced inverting unity gain amplifier input being coupled to receive said second gyro output signal;

said inverting unity gain summing amplifier first input being coupled to said second gyro output signal said inverting unity gain summing amplifier second input being coupled to said first gyro output signal;

said inverting unity gain difference amplifier inverting input being coupled to said first gyro output signal;

said inverting unity gain difference amplifier non-inverting input being coupled to said second gyro output signal;

whereby, said first and second ground referenced inverting amplifier output signals, each being coupled to respective first and second circuit output terminals, each signal having a frequency double the frequency of said first and second input signals and said respective first and second input signal phase relationship is preserved in said first and second output signals; and whereby, said laser gyro accuracy is increased.

* * * * *